United States Patent [19]

Takahashi et al.

[11] Patent Number: 5,226,756
[45] Date of Patent: Jul. 13, 1993

[54] DISK ASSEMBLY

[75] Inventors: Shigeo Takahashi, Anjo; Tatsuya Nishino, Nagoya, both of Japan

[73] Assignee: Aisin Seiki Kabushiki Kaisha, Kariya, Japan

[21] Appl. No.: 857,969

[22] Filed: Mar. 26, 1992

[30] Foreign Application Priority Data

Mar. 29, 1991 [JP] Japan .................................. 3-91336

[51] Int. Cl.⁵ .............................................. F16B 11/00
[52] U.S. Cl. .................................. 403/274; 403/283; 403/375; 74/446; 29/894
[58] Field of Search ................ 403/274, 283, 408.1, 403/388, 375, 122; 74/572, 446, 447, 439; 72/325, 326; 29/894–894.3, 513

[56] References Cited

U.S. PATENT DOCUMENTS

| | | | |
|---|---|---|---|
| 711,991 | 10/1902 | Mason, Jr. | 74/447 |
| 1,264,642 | 4/1918 | Harley | 74/572 |
| 1,265,811 | 5/1918 | Ohlson | 74/446 X |
| 1,924,385 | 8/1933 | Van Der Veer | 74/572 X |
| 2,533,779 | 12/1950 | Empe | 29/513 |
| 4,009,621 | 3/1977 | Segawa | 74/447 X |
| 4,020,937 | 5/1977 | Winter | 74/572 X |
| 4,144,773 | 3/1979 | Addicks | 74/447 X |
| 4,205,426 | 6/1980 | Stillman, Jr. | 403/274 X |
| 4,562,636 | 1/1986 | Carmillet | 29/513 |

FOREIGN PATENT DOCUMENTS

| | | | |
|---|---|---|---|
| 121361 | 9/1979 | Japan | 403/274 |
| 1-98962 | 7/1989 | Japan . | |
| 1248148 | 9/1971 | United Kingdom | 403/122 |
| 2218771 | 11/1989 | United Kingdom | 403/274 |

Primary Examiner—Randolph A. Reese
Assistant Examiner—Harry C. Kim
Attorney, Agent, or Firm—Burns, Doane, Swecker & Mathis

[57] ABSTRACT

A disk assembly is comprised of a circular plate having an outer flange portion extending in the radial direction and a plurality of tongues each of which is pressed out in the axial direction and an annular member whose inner radius is equals to that of each tongue, wherein each distal end of each tongue is snugly fitted in the annular member and the outer flange portion is fixed to one side of the annular member.

8 Claims, 7 Drawing Sheets

DISK ASSEMBLY

BACKGROUND OF THE INVENTION

1. Field of the Invention

The present invention relates to a disk assembly and in particular to a disk assembly wherein an annular member is mounted on an outer periphery of a circular plate.

2. Description of the Related Art

As shown in FIGS.8 and 9, a conventional disk assembly 1 includes a a ring gear 2 which is to be regarded as an annular member that is mounted on an outer periphery 3A of a disk plate or circular plate 3. A connection between the ring gear 2 and the disk plate 3 is assured by a welding 4. The disk plate 3 is provided with a plurality of bolt holes 3B for connection to a torque converter, a hole 3D for receiving a crank shaft, a plurality of bolt holes 3E, and a plurality of bolt holes 3F to be used for adjusting the stiffness or rigidity of the disk plate 3.

The foregoing assembly 1 is employed in a torque converter shown in FIG.10 as an assembly of a driving plate 11 and a starting gear 12 as disclosed in Japanese Utility Model Laid-open Print No. 98962 of the 1st year of Heisei Era (1989). It is to be noted that the disk plate 3 and the ring gear 2 correspond to the driving plate 11 and the starting gear 12, respectively.

This assembly serves for the torque transmission between an engine output shaft 13 and a torque converter 14. The gear 12 is set to be brought into engagement with a pinion gear 16 upon engine starting so that the engine is initiated by being transmitted with a force from the starter motor 15 to the output shaft 13 via the gear 12 and the plate 11.

In the foregoing assembly, upon its manufacturing, accuracies are required in the co-axial relationship between the output shaft 13 of the engine and the gear 12, and axial position (the horizontal direction position in FIG.10), which demands careful attention or caution upon the combination of the gear 12 on the plate 11. To meet this demand, the conventional manner has been performed by cutting the outer periphery of the plate 11 on the basis of a reference hole.

However, in such method, the combination of the gear 12 on the plate 11 is established by welding or rivetting, which requires the positioning of the assembly in its axial direction to be performed by using a specific tool with a high degree of skill and the accuracy is not so satisfactory.

SUMMARY OF THE INVENTION

It is an object of the invention to provide a disk assembly which obviates the above conventional drawbacks.

It is another object of the invention to provide a disk assembly which can be obtained without a high skill.

It is a further object of the present invention to provide a manufacturing method of a disk assembly.

In order to attain the foregoing objects, a disk assembly is comprised of a circular plate having an outer flange portion extending in the radial direction and a plurality of tongues each of which is pressed out in the axial direction and an annular member whose inner radius is equal to that of each tongue, wherein each distal end of each tongue is snugly fitted in the annular member and the outer flange portion is fixed to one side of the annular member.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENTS

Figure 1:
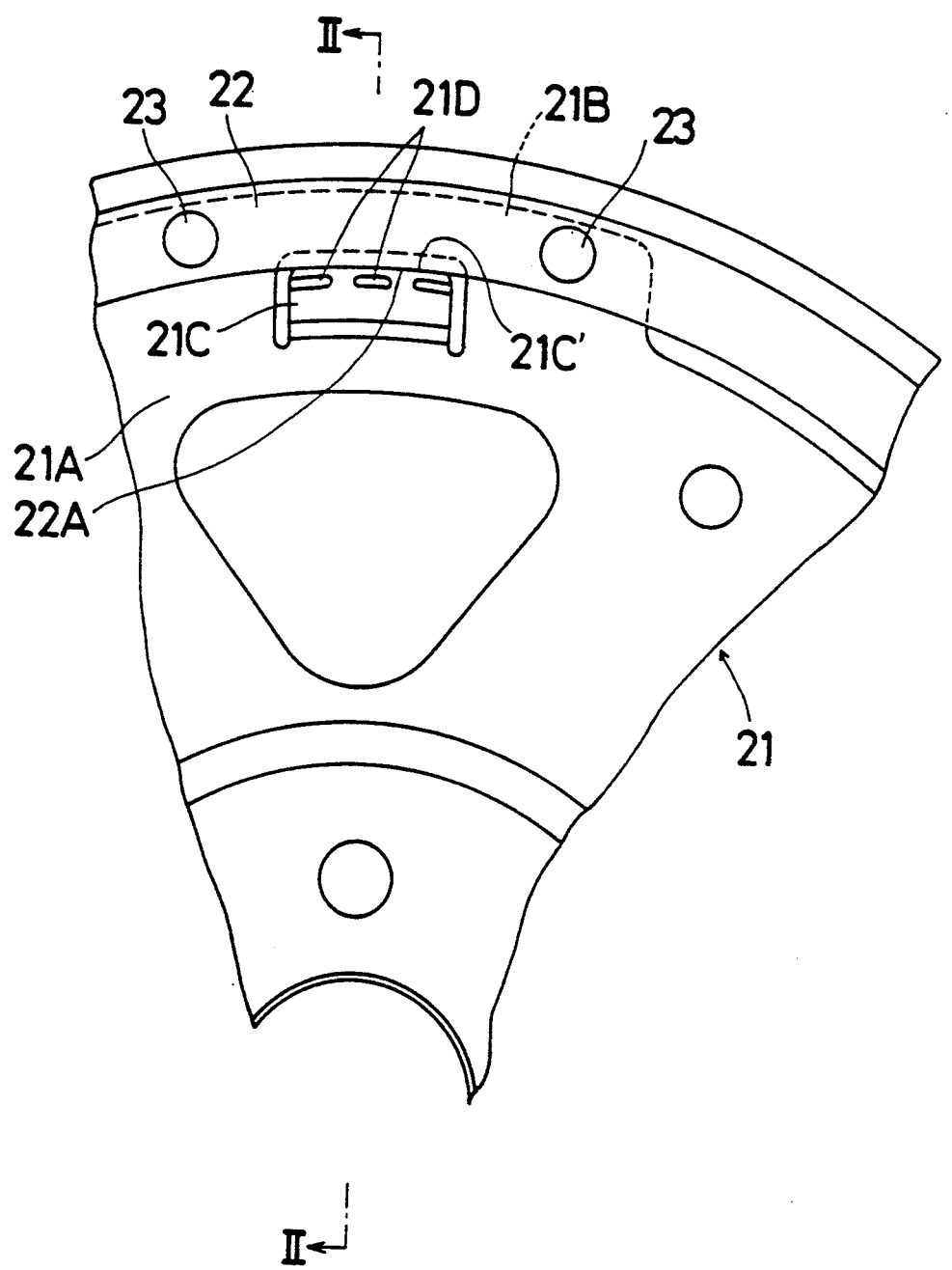
FIG. 1 is a partial front view of a disk assembly according to one embodiment of the present invention.
Figure 2:
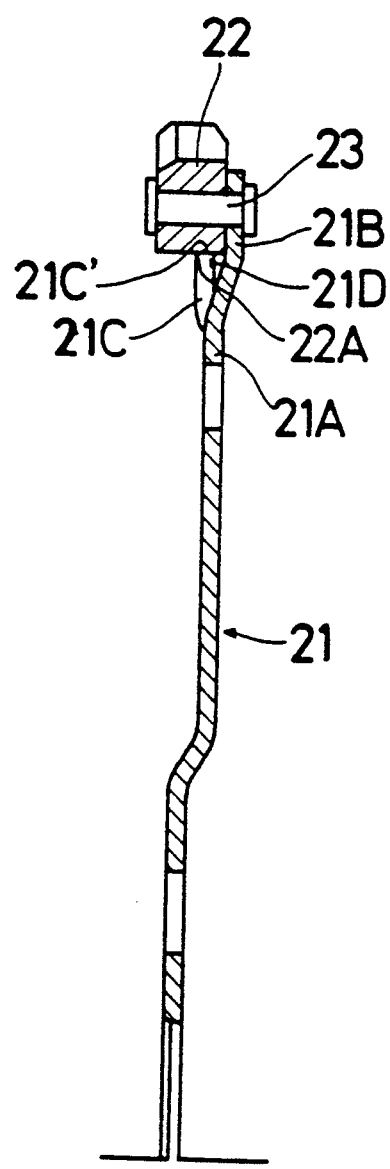
FIG. 2 is a cross-sectional view of a disk assembly taken along line II—II in FIG.1.

Referring to FIGS.1 and 2, an outer periphery of a plate 21 which is formed into an annular thin disk has a flat portion 21A, an outer flange portion 21B which extends outwardly so as to be in engagement with an inner periphery 22A of a ring gear 22, and a plurality of tongue portions 21C each of which is obtained by notching the flat portion 21A. A distal end 21C' of the tongue portion 21C is in engagement with the inner periphery 22A of a ring gear 22.

In the neighbourhood of the distal end 21C' of the tongue portion 21C, the tongue portion 21C is formed with three concave portions 21D. The outer flange portion 21B and the ring gear 22 are fastened with each other by a plurality of rivets 23.

Figure 3:
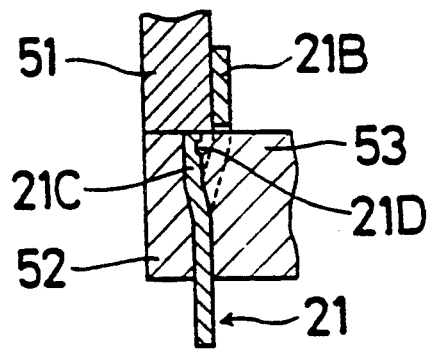
FIG. 3, FIG.4 and FIG.5 are views for illustration a manufacturing method of a disk assembly shown in FIG.1.

In order to establish a snug engagement fitting of the distal end 21C' of the tongue portion 21C with the inner periphery 22A of a ring gear 22, a high degree of accuracy is required. However, a normal pinching method fails to meet this requirement. In light of this, as shown in FIG.3, the distal end 21C' of the tongue portion 21C is obtained by pressing the tongue portion 21C between an upper pattern or punch 53 and a lower pattern 52 while mounting the plate 21 on a pattern ring 51 in order to form the concave portion 21D on the tongue portion 21C.

Figure 4:
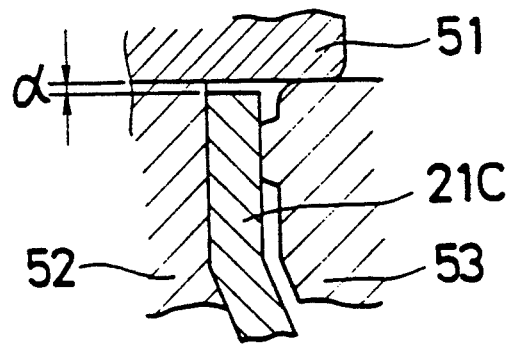
Figure 5:
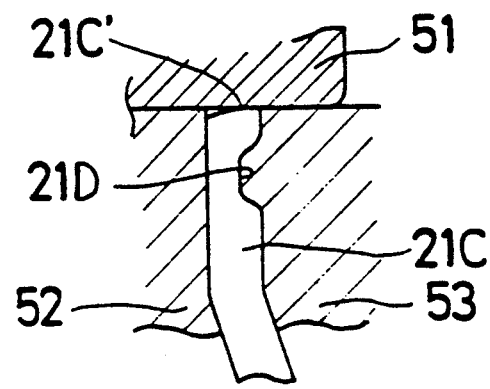

In this method, as shown in FIG.4, the setting of a clearance $\alpha$ ranging from 0.3 mm to 0.5 mm between the pattern ring 51 and the the tongue portion 21C will bring an expected snug fitting of the distal end 21C' of the tongue portion 21C into the inner periphery 22A of a ring gear 22 as shown in FIG.5.

Figure 6:
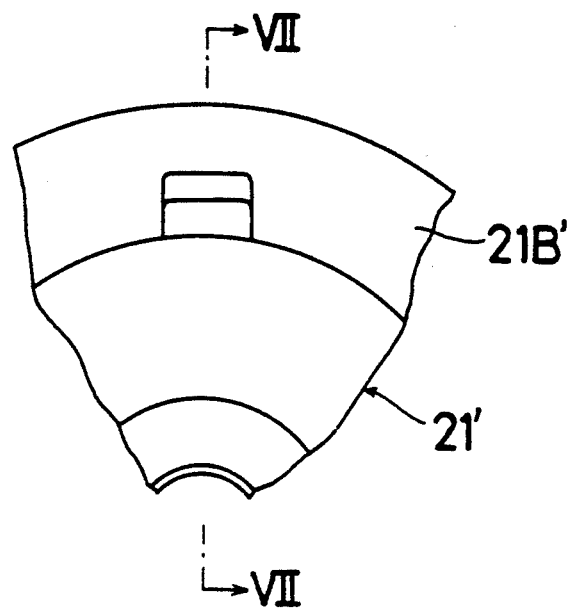
FIG. 6 is a partial front view of a disk assembly according to another embodiment of the present invention.
Figure 7:
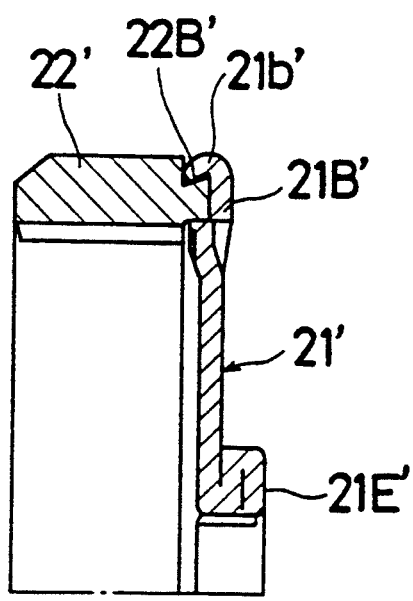
FIG. 7 is a cross-sectional view taken along line VII-—VII in FIG.6.
Figure 8:
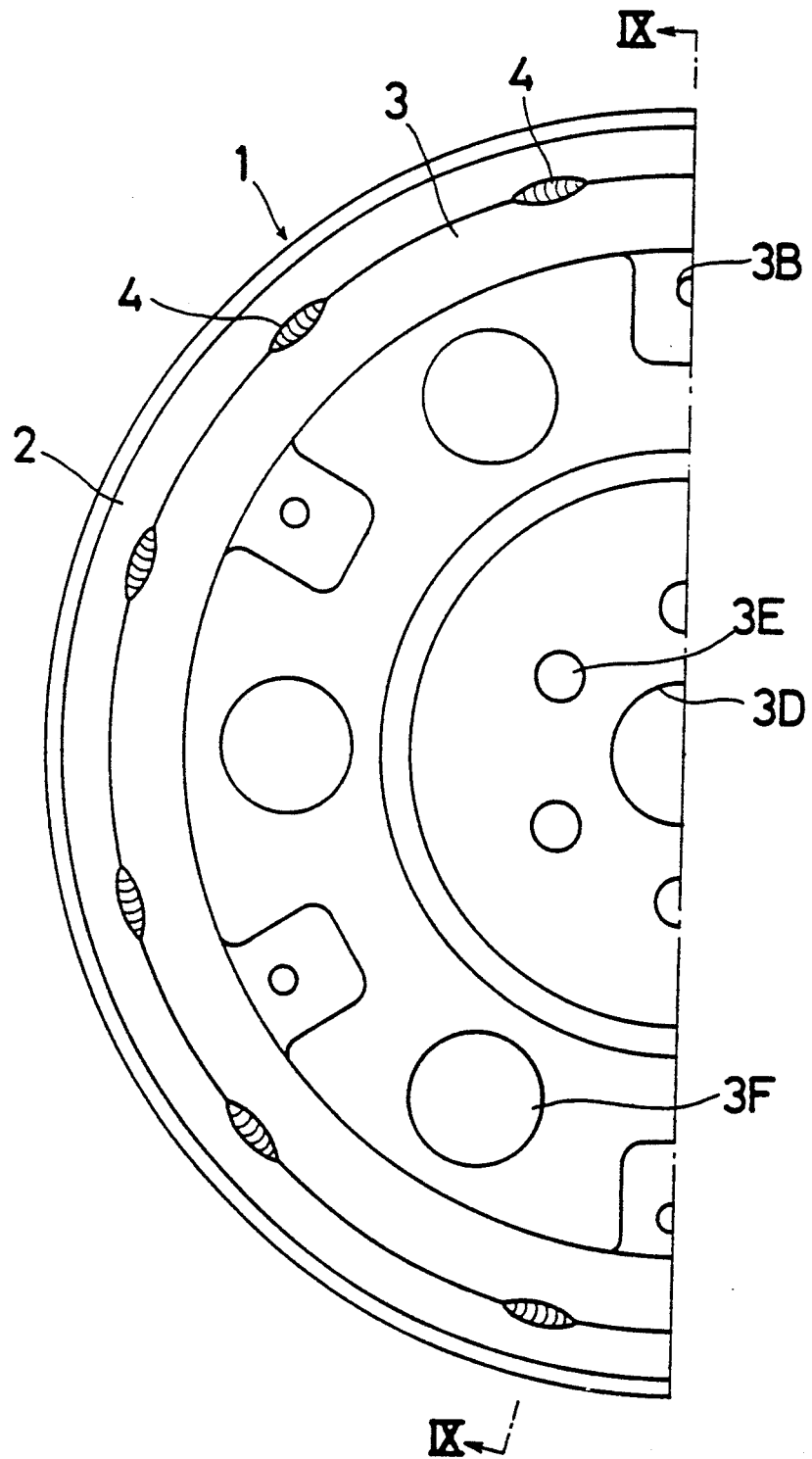
FIG. 8 a partial front view of a conventional disk assembly.
Figure 9:
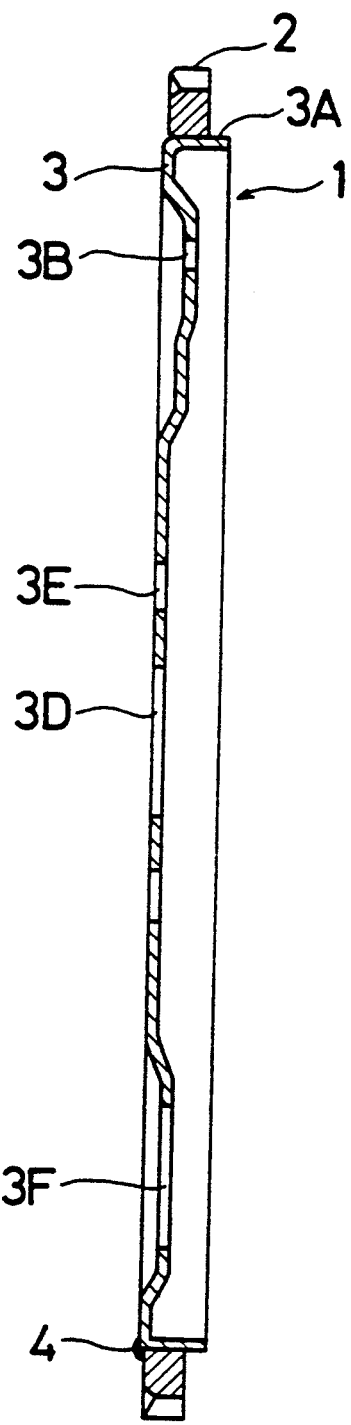
FIG.9 is a cross sectional view taken along line IX—IX in FIG.8.
Figure 10:
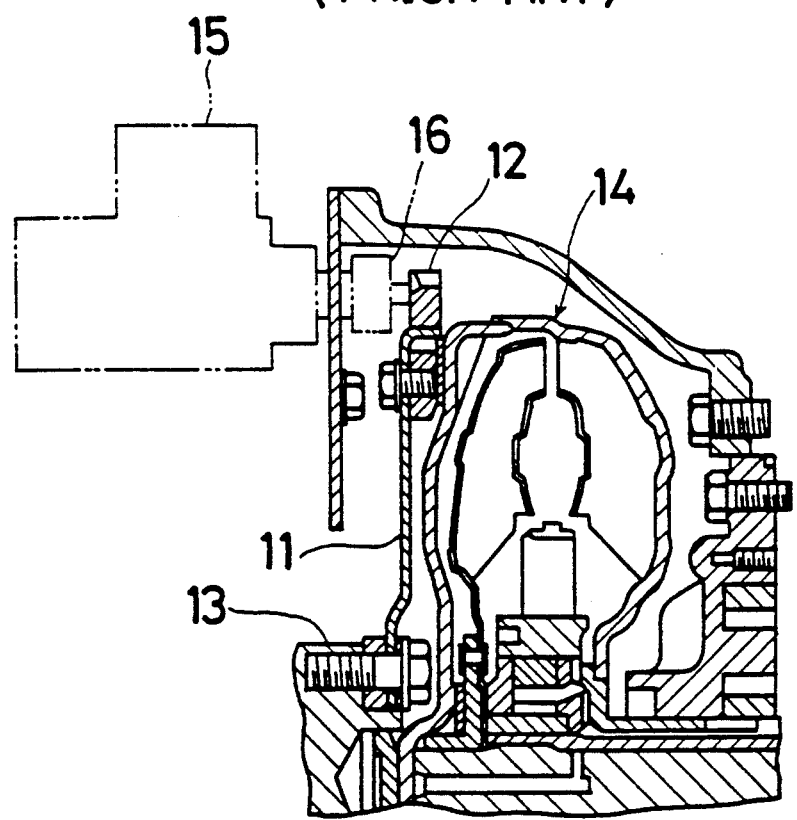
FIG.10 is a cross-sectional view of a part of a torque converter.

Thus, a fitting of the resultant plate 21 into the ring gear 22 having a radius which is equal to that of the ring pattern 51, resulting in an easy co-axial arrangement between the plate 21 and the ring gear 22. Another embodiment of the present invention is shown in FIGS.6 and 7 which is applied to a ring gear 22' to be used in planetary gear system. An outer periphery 21b' of a flange 21B' of a plate 21' is punched in or rivetted into an annular groove 22B' of a ring gear 22'. An inner periphery 21E' of a plate 21' is formed into a thickened configuration as illustration.

As mentioned above, according to the present invention, the axial positioning between the disk and the annular plate can be established at the outer flange portion of the plate, and the radial adjustment can be established at the tongue, thereby enabling manufacturing accuracy of the disk assembly without a high degree of skill.

Obviously numerous modifications and variations of the present invention are possible in light of the above teachings. It is therefore to be understood that within the scope of the appended claims, the invention may be practiced otherwise than as specifically described herein.

What is claimed is:

1. A disk assembly comprising:
   a circular plate having an outer flange portion extending in a radial direction of the circular plate, said circular plate having a plurality of tongues each of which is pressed out in an axial direction of the circular plate and each of which includes a distal free end defining an outer radius; and
   an annular member having an inner periphery defining an inner radius which is equal to the outer radius of each tongue.
   wherein the distal free end of each tongue is snugly fitted in said inner periphery of the annular member in order to establish radial adjustment between the circular plate and the annular member, and the outer flange portion is fixed to one side of the annular member in order to establish an axial positioning between the circular plate and the annular member.

2. A disk assembly in accordance with claim 1, wherein a distal end of the outer flange portion is fixed to the one side of the annular member by a rivet.

3. A disk assembly in accordance with claim 1, wherein a distal end of the outer flange portion is interlocked to the one side of the annular member.

4. A disk assembly in accordance with claim 1, wherein an inner periphery of the circular plate is thickened in the axial direction.

5. A method for manufacturing a disk assembly in which a circular plate is connected at its outer periphery with an annular member comprising the steps of:
   (1) forming a circular plate in such a manner that the circular plate has an outer flange portion extending in a radial direction and a plurality of circumferentially arranged tongues each of which is pressed out in an axial direction;
   (2) preparing a pattern ring similar in shape to an annular member, said pattern ring having an inner periphery;
   (3) setting the circular plate with respect to the pattern ring in such a manner that the outer flange portion of the circular plate is mounted on one side of the pattern ring and each tongue of the circular plate is disposed between an upper pattern and a lower pattern within the pattern ring so as to be opposed to the inner periphery of the pattern ring with a clearance;
   (4) holding each tongue of the circular plate under pressure in order to establish a snug fitting of each tongue with the inner periphery of the pattern ring;
   (5) inserting each tongue of the circular plate into an inner periphery of the annular member in order to establish a radial adjustment between the circular plate and the annular member; and
   (6) connecting a distal end of the outer flange portion of the circular plate to one side of the annular member in order to establish an axial positioning between the circular plate and the annular member.

6. A method in accordance with claim 5, wherein the clearance ranges from 0.3 mm to 0.5 mm inclusive.

7. A method in accordance with claim 5, wherein a rivet is used when a distal end of the outer flange portion of the circular plate is connected to one side of the annular member.

8. A method in accordance with claim 5, wherein an interlocking manner is used when a distal end of the outer flange portion of the circular plate is connected to one side of the annular member.

* * * * *